United States Patent [19]
Naimpally et al.

[11] Patent Number: 5,329,317
[45] Date of Patent: Jul. 12, 1994

[54] ADAPTIVE FIELD/FRAME FILTER FOR INTERLACED VIDEO SIGNALS

[75] Inventors: Saiprasad V. Naimpally, Langhorne, Pa.; Hee-Yong Kim, Plainsboro, N.J.

[73] Assignee: Matsushita Electric Corporation of America, Secaucus, N.J.

[21] Appl. No.: 954,283

[22] Filed: Sep. 30, 1992

[51] Int. Cl.$^5$ .......................... H04N 7/12; H04N 5/12
[52] U.S. Cl. .................................... 348/620; 348/607; 348/618
[58] Field of Search ............... 358/105, 133, 136, 160, 358/167, 36; 348/606, 607, 608, 618, 619, 620

[56] References Cited
U.S. PATENT DOCUMENTS
5,150,207 9/1992 Someya .......................... 358/133
5,185,664 2/1993 Darby ............................. 358/167

*Primary Examiner*—Tommy P. Chin
*Assistant Examiner*—E. Lenchak
*Attorney, Agent, or Firm*—Ratner & Prestia

[57] ABSTRACT

A motion adaptive vertical filter is used to filter an interlaced video signal on a frame basis in areas of the image that are not in motion and on a field basis in areas that are in motion. A soft switch mixes the field filtered data and the frame filtered data in areas where there is relatively little motion to prevent artifacts which may be caused by abruptly switching between the two vertical filtering schemes. The frame vertical filter reduces the vertical resolution of still NTSC images to 180 cycles per picture height (CPH) while the field filter reduces the vertical resolution to 90 CPH.

8 Claims, 6 Drawing Sheets

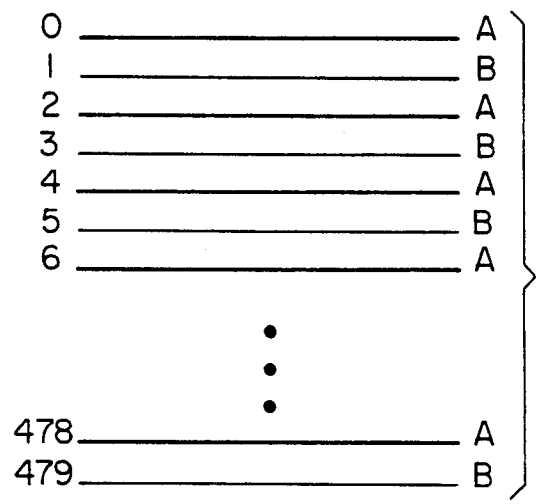
FIG. 1a
PRIOR ART
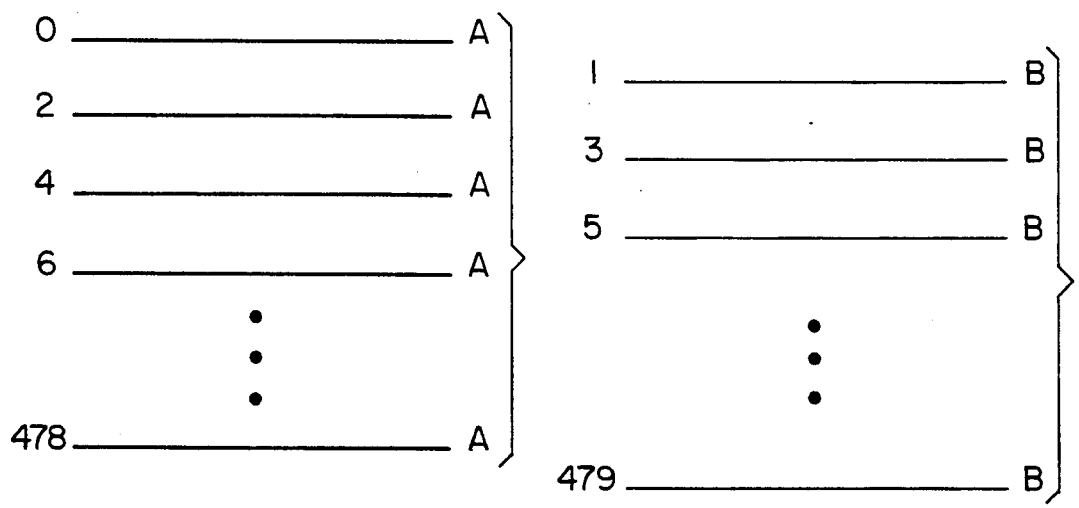
FIG. 1b
PRIOR ART
FIG. 1c
PRIOR ART

ADAPTIVE FIELD/FRAME FILTER FOR INTERLACED VIDEO SIGNALS

BACKGROUND OF THE INVENTION

The present invention concerns spatial filtering of video images and, in particular, an adaptive filtering system which switches between field-based and frame-based filters on a block-by-block basis responsive to motion in the corresponding blocks of the video image.

It is often desirable to filter interlaced video signals for many different applications. For example, if the image is to be reduced in size, it is desirable to low-pass filter the image, both horizontally and vertically, to prevent aliasing distortion in the subsampled image. For image data compression applications it may also be desirable to band-limit the video signal prior to compression to reduce the visibility of artifacts arising from the image compression process.

A purely horizontal filter is fairly simple to implement since it involves temporally filtering successive picture elements (pixels) on each line of the interlaced video signal. Vertical filtering of an image signal, however, is more complex since there are problems implementing a vertical filter, either on a purely frame basis or a field basis.

To understand these problems, it is helpful to describe the structure and timing of an interlaced video signal. FIG. 1a illustrates an image frame of, for example, an NTSC video signal. The exemplary frame exhibits the highest vertical resolution that may be obtained in such a signal. This is achieved by having alternate lines, A, of the image at a different signal level than the intervening lines, B. Since there are 480 lines in the active portion of the NTSC video signal, the maximum vertical resolution that can be achieved is 240 cycles per picture height (CPH) as dictated by the Nyquist criteria.

A typical NTSC video signal, however, is neither transmitted, received nor displayed as shown in FIG. 1a. Instead, the signal is transmitted as two fields shown in FIGS. 1b and 1c respectively. As shown in FIG. 1b, all of the lines of the first field have the level A while, as shown in FIG. 1c, all of the lines of the second field have the level B. Due to persistence of vision in the human eye, the two fields, having a display rate of 60 fields per second, are integrated into the frame image shown in FIG. 1a, having a repetition rate of thirty frames per second.

If there is no motion in the image represented by the video signal, that is to say, if the pixels in the image are the same from frame to frame, it is preferable to filter the image as a frame instead of as two fields. This is illustrated by the frame and fields shown in FIGS. 1a, 1b and 1c. If the image frame shown in FIG. 1a were vertically filtered by a filter having a cut-off resolution of, for example, 180 CPH, the result would be a frame image having lower resolution than the original frame image. If, however, the fields shown in FIGS. 1b and 1c were passed through the same filter, there would be no difference between the image produced by the input signal and that produced by the output signal. This can be seen because there is no high-resolution component in either of the two fields while there is a high-resolution component in the single frame which results from combining the two fields.

On a more theoretical level, FIG. 2a shows the passband/stopband spectrum of a frame vertical filter for the case where the cut-off resolution is 180 CPH. As can be seen in FIG. 2a, the shaded region, representing vertical frequencies passed by the filter, is limited between 0 and 180 CPH. Image components having vertical resolution between 180 CPH and 240 CPH are not passed by this vertical filter. FIG. 2b shows this same filter applied on a field basis. As can be seen, the integrated frame image generated from this filtered field signal has a stopband between 90 and 150 CPH and a passband elsewhere. This is obviously not a low-pass filtered characteristic.

On moving images, field filtering may still be more desirable than frame filtering because it substantially reduces temporal artifacts which may be caused by frame filtering.

For example, FIG. 3 illustrates how the image of a box moving to the right would be represented by an interlaced video signal. The outline of the box in the first field is illustrated by the solid line and, in the second field, by the broken line. When fields one and two are combined to form a frame, regions of serrations (i.e. spurious alternate lines) appear along the vertical edges of the box. These serrations occupy a horizontal dimension equal to the motion of the box in one field period. If these image fields were to be combined into a single frame, frame filtered and then displayed, these artifacts would be displayed, albeit at a reduced resolution in each field of the frame.

If, however, the image were processed as two successive fields, there would be no temporal artifacts, each field image would have the object in its proper position in the time sequence. Obviously, such temporal artifacts are to be avoided; therefore, in moving areas of an image, field filtering may be preferred to frame filtering.

SUMMARY OF THE INVENTION

The present invention is embodied in an adaptive field/frame filtering system. The system includes a motion detector which determines the relative motion between two fields of each frame, a frame-oriented filter and a field-oriented filter. The motion detector is coupled to circuitry which blends the signals provided by the frame filter and field filter on a block-by-block basis so that a stationary image is entirely frame-filtered, a fast-moving image is entirely field-filtered, and images exhibiting other degrees of motion include some field-filtered and some frame-filtered components.

BRIEF DESCRIPTION OF THE DRAWINGS

FIGS. 1a, 1b and 1c (prior art) are frame and field diagrams useful for describing the environment of the present invention.

DETAILED DESCRIPTION

Figure 2A:
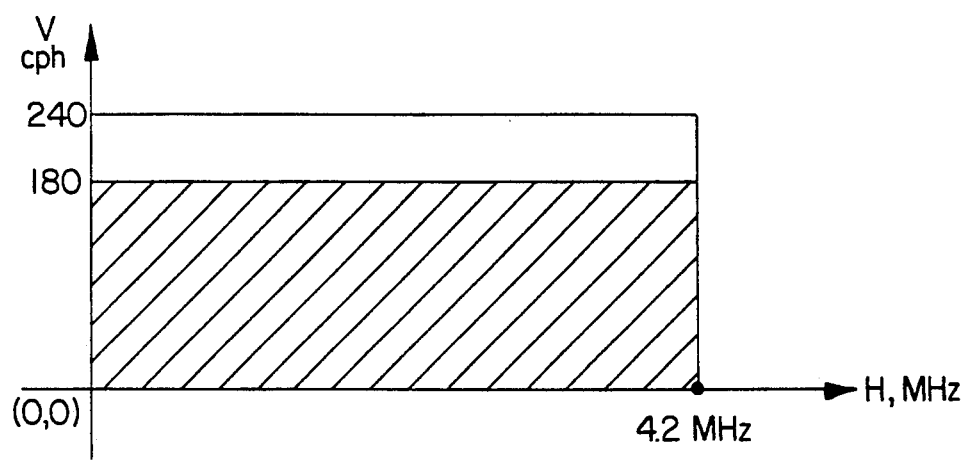
FIGS. 2a and 2b are graphs of vertical resolution versus horizontal frequency which are useful for describing the operation of respective frame and field-based low-pass filters.
Figure 2B:
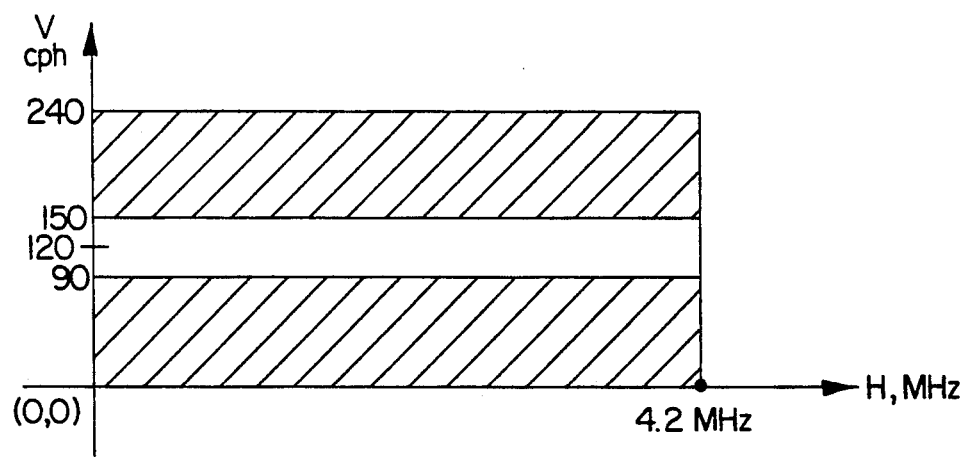
Figure 3:
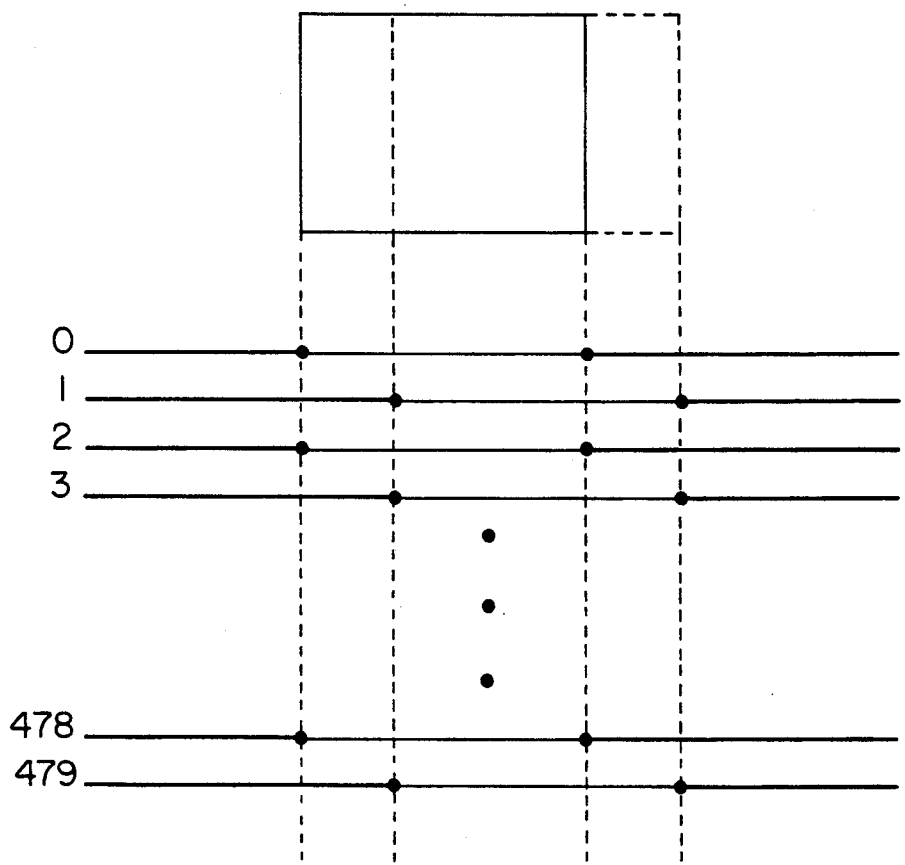
FIG. 3 (prior art) is a diagram of an interlaced video signal which is useful for describing temporal artifacts.
Figure 4:
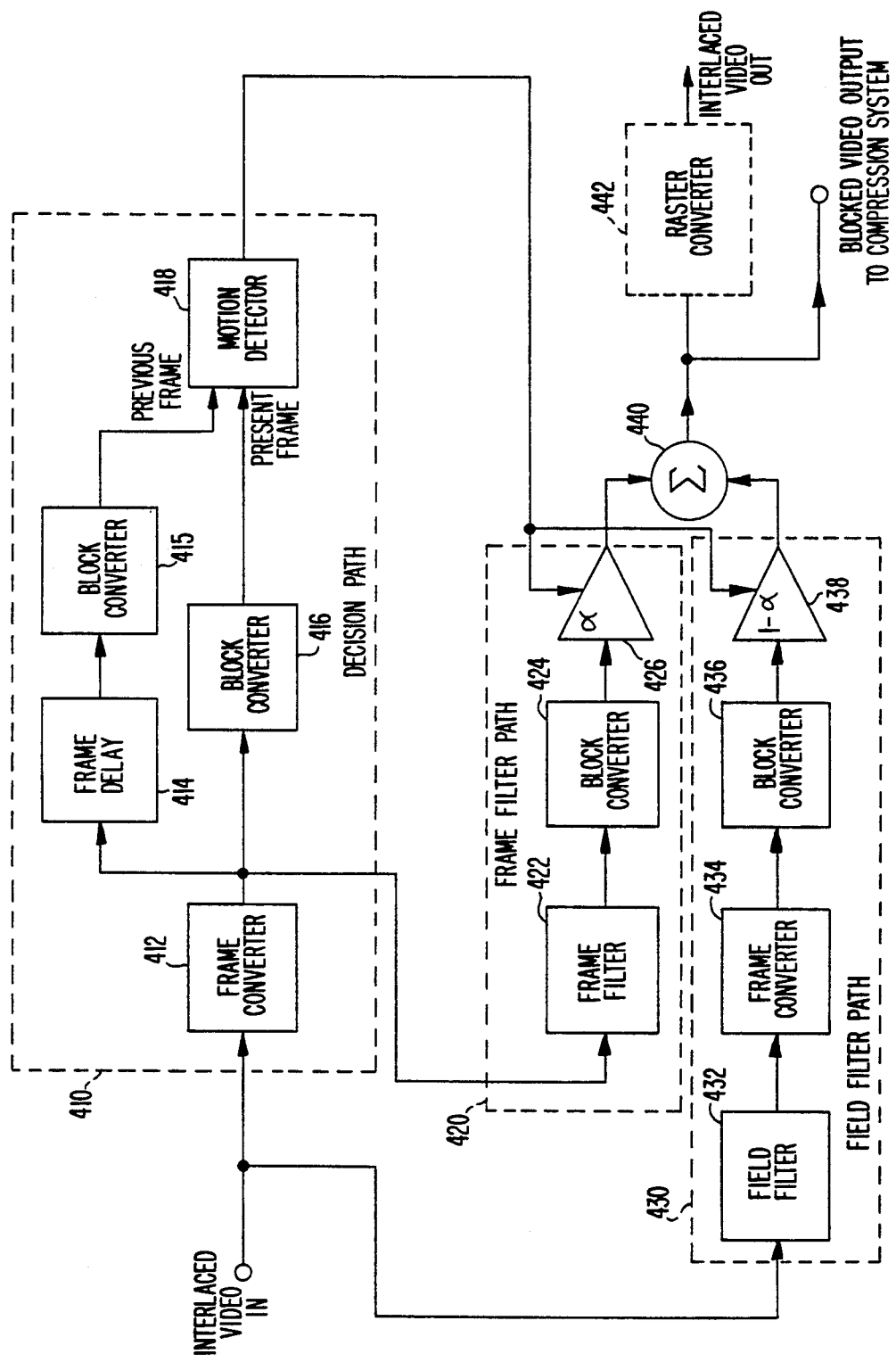
FIG. 4 is a block diagram of an exemplary field/frame-based filter system according to the present invention.

FIG. 4 is a block diagram of an adaptive field/frame filter system in accordance with the present invention. In FIG. 4, an interlaced video signal provided, for example, by a conventional video camera is applied in parallel to three circuit portions. The first circuit portion, a decision path 410, locates blocks in the image which exhibit motion from frame to frame. A second circuit portion is a frame filter path 420 which is used to low-pass filter areas of the image which are found to be substantially free of motion. The remaining circuit portion is a field filter path 430 which filters the remaining areas of the image, that is to say, those portions of the image which exhibit motion from frame to frame. The output signals of the frame filter path and the field filter path are combined by summing circuitry 440 to generate a blocked video output signal. This signal may also be applied to a raster converter 442, shown in phantom, to produce an interlaced output video signal.

The decision path 410 includes a frame converter 412 which combines successive fields of the received interlaced video signal to produce successive frames of video signal information. The frame converter 412 may include, for example, two frame memories (not shown) arranged in a ping-pong configuration such that while one frame memory is receiving pairs of interlaced video fields and forming them into frames, the other frame memory is providing pixels from a previously stored frame to the frame delay 414 and block converter 416 of the decision path 410 and to the frame filter 422 of the frame filter path, described below.

The frame delay 414 delays the pixel samples provided by the frame converter 412 by one frame interval. The output of the frame delay 414 is applied to a block converter 415. Block converters 415 and 416 read pixel values, sixty-four at a time, from the respective frame delay 414 and frame converter 412.

Figure 5:
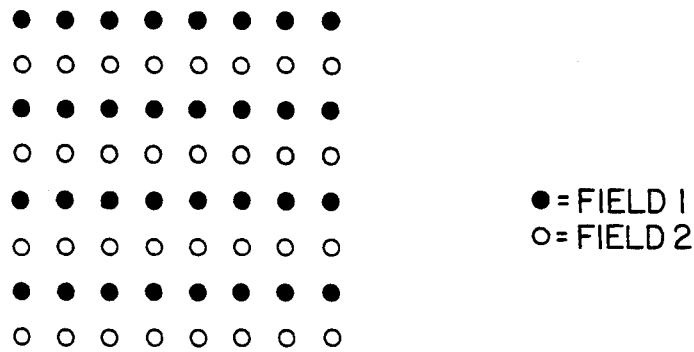
FIG. 5 is a pixel diagram which illustrates the operation of the frame converter and block converter shown in FIG. 4.

An exemplary block of pixels is shown in FIG. 5. As can be seen from FIG. 5, the block includes eight adjacent pixels from each of eight successive lines in the frame. These lines include four lines from field interleaved with four lines from field two. The blocks of pixels provided by the block converter 415 represent image information from a previous frame, while the blocks provided by the block converter 416 represent image information from the present frame.

The motion detector 418 calculates a measure of the motion in the underlying image between the previous frame and present frame as the sum of squared differences (SSD) between the present frame and the previous frame. The SSD value for pixels $a_{ij}$ from the present frame and $b_{ij}$ from the previous frame is calculated according to equation (1).

$$SSD = (1/64) \sum_{i=1}^{8} \sum_{j=1}^{8} (a_{ij} - b_{ij})^2 \quad (1)$$

Without loss of generality, if we assume that pixel values can range between a value of zero for black and one for white, then the SSD values can range between zero and one. If the video signal contains no noise and there was no motion between the images from frame to frame, the SSD value would be equal to zero. Higher levels of motion, such that all pixels in the current field are white and all pixels in the previous field are black, would produce an SSD value of one. Pixel values in the two frames between these extremes will produce SSD values between zero and one.

Figure 6:
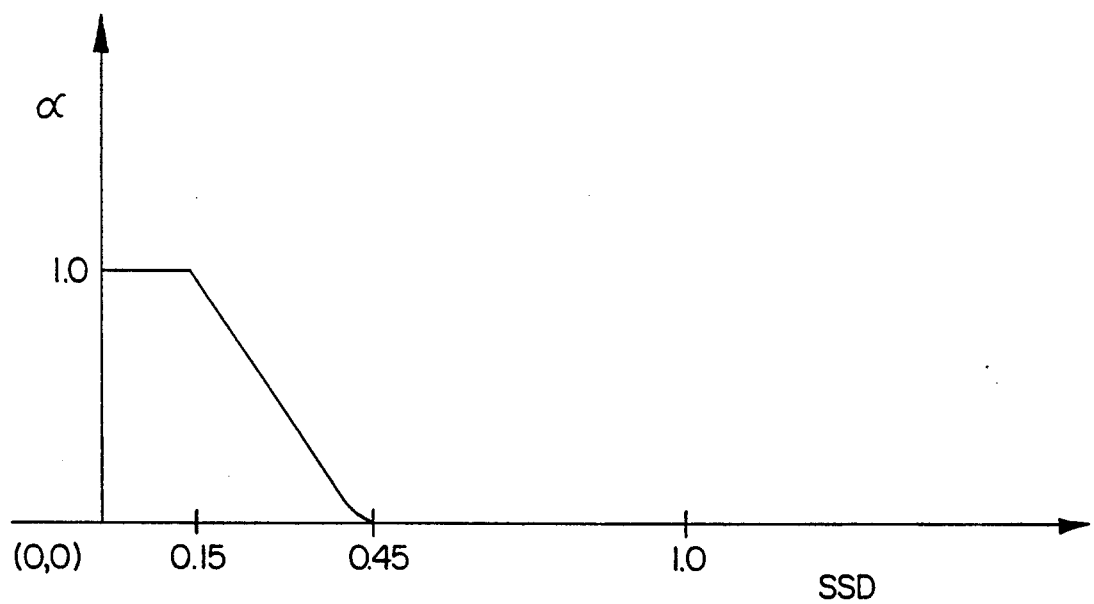
FIG. 6 is a graph of scaling factor versus summed squared difference which is useful for explaining the blending of the field and frame-filtered signals produced by the circuitry shown in FIG. 4.

In the present embodiment of the invention, the SSD value is used to generate a soft switching value, $\alpha$, which is, in turn, used to switch the system between frame filtering and field filtering the interlaced video signals. The value $\alpha$ is generated by applying the SSD values calculated according to equation (1) to a read only memory (ROM) which is programmed as a look-up table (LUT). An exemplary program for the LUT is shown in FIG. 6. In this Figure, the value of $\alpha$ is unity for SSD values between zero and 0.15. For SSD values between 0.15 and 0.45, the value of $\alpha$ decreases from unity to zero with a slope of $-2.5$. For SSD values greater than 0.45, the value of $\alpha$ is zero.

As described above, the frame filter path 420 receives the output signal from frame converter 412 into a frame filter 422. Frame filter 422 may be, for example, a twenty-one tap finite impulse response (FIR) filter having the weighting coefficients listed in Table I.

TABLE I

| |
|---|
| H[−10] = H[10] = −0.002553 |
| H[−9] = H[9] = 0.002570 |
| H[−8] = H[8] = 0.0 |
| H[−7] = H[7] = 0.008690 |
| H[−6] = H[6] = 0.021158 |
| H[−5] = H[5] = −0.024368 |
| H[−4] = H[4] = 0.0 |
| H[−3] = H[3] = 0.060948 |
| H[−2] = H[2] = −0.145527 |
| H[−1] = H[1] = 0.220548 |
| H[0] = 0.751827 |

In the filter, each tap is separated from the next successive tap by a one-horizontal-line period (1H) ms delay. The output signal of each tap in the 20H delay line is weighted according to the coefficients in Table I and then summed to produce an output value. Of course, the output taps H[−8], H[−4], H[4] and H[8], which have weights of zero may be omitted from the weighting and summing operations.

Figure 7:
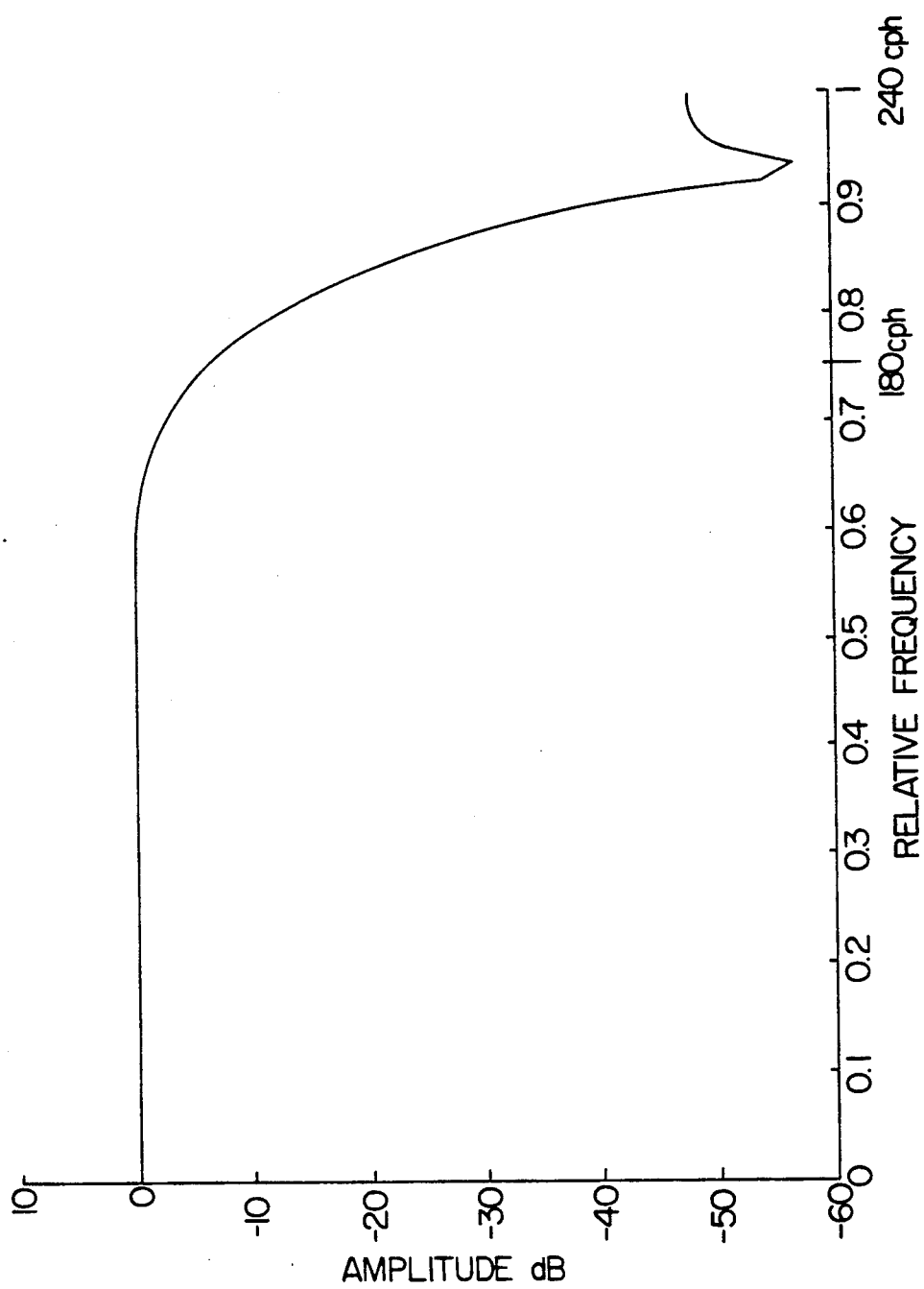
FIG. 7 is a graph of signal amplitude versus normalized relative frequency which is useful for describing the frequency response characteristic of the field and frame filters shown in FIG. 4.

FIG. 7 is a graph of amplitude versus normalized relative frequency which illustrates the frequency-response characteristic of the frame filter 422. The horizontal axis in this figure is unitless and represents normalized frequencies, that is to say, frequency values which have been divided by a normalizing frequency value. As shown in FIG. 7, this filter has a 6 dB point at a normalized relative frequency of 0.75. When used as a frame filter, the relative frequency 1 corresponds to 240 CPH; thus, in this instance, the normalized relative frequency 0.75 corresponds to 180 CPH.

Referring to FIG. 4, the output signal of the frame filter 422 is applied to a block converter 424 which operates in substantially the same manner as the block converters 415 and 416 described above. Block converter 424, in turn, provides blocks, each containing 64 frame-filtered video pixels, to a scaling circuit 426. The scaling circuit 426 is coupled to receive the signal $\alpha$ provided by the motion detector 418, as described above. Scaling circuit 426 thus multiplies the pixel values provided by block converter 424 by the factor $\alpha$ and applies the result to one input port of summing circuit 440. The other input port of summing circuit 440 is coupled to receive corresponding blocks of pixels which have been field filtered, combined into a frame format and converted to block format. These pixels are provided through the field filter path 430.

In the field filter path 430, the input interlaced video signals are received directly by a field filter 432. In the exemplary embodiment of the invention, the field filter 432 may be identical in structure to the frame filter 422. Since, however, the input signal to the field filter 432 is an interlaced video signal, the field filter 432 operates on twenty-one successive lines from a single field. This normalizing frequency and, so, the interpretation of the frequency-response characteristic shown in FIG. 7. For a field filter, a normalized relative frequency of 1 corresponds to 120 CPH; thus, the breakpoint at the normalized relative frequency of 0.75 now corresponds to 90 CPH.

The filtered pixel values provided by the field filter 432 are applied to a frame converter 434 which may be substantially the same as the frame converter 412 described above. Converter 434 provides frames of video pixels to a block converter 436 which may operate in the same manner as the block converters 415, 416 and 424 described above. The 64 pixel blocks of field filtered video signals provided by the block converter 436 are applied to a scaling circuit 438 which is also coupled to the motion detector 418. Instead of scaling each pixel value in the block by $\alpha$ as in scaling circuit 426, however, scaling circuit 438 scales each pixel value in the block by a factor of $1-\alpha$. The output signal of the scaling circuit 438 is the signal which is applied to the second input port of the summing circuit 440.

As described above, the value $\alpha$ is related to the SSD as calculated by equation (1) in the manner shown in FIG. 6. Thus, when the measure of motion between the previous frame and the present frame is small, such that the SSD value calculated by the motion detector 418 is less than 0.15, the summing circuit 440 provides a pure frame-filtered signal as its output. As the measure of motion increases above this value, a combination of frame-filtered and field-filtered signals are provided. When the motion between the previous frame and the present frame is above a threshold value, an SSD value of 0.45, the output signal of the summing circuit 440 is blocks of pixels in frame order which represent two fields, where each of the two fields has been separately field-filtered.

This combination of field-filtered signals and frame filtered signals allows a stationary image, in which high vertical resolution is desirable, to be displayed using entirely frame-filtered signals. A fast moving image, however, in which temporal resolution is more important is displayed using entirely field-filtered signals. Images exhibiting other degrees of motion include some field-filtered and some frame filtered components to compromise between vertical and temporal resolution.

As shown in FIG. 4, the output signal of the summing circuit 440 may be applied as a blocked video signal to a compression system or, alternatively, it may be applied to a raster converter 422, shown in phantom, to produce an interlaced video output signal.

Although the frame and field filters in the exemplary embodiment of the invention have been shown as being the same, it is contemplated that different frame and field filters may be used with corresponding results. Furthermore, it is contemplated that the frame and field filters 422 and 432 may have different types of frequency-response characteristics, for example, high-pass, bandpass, or notch.

Although the invention has been described in terms of an exemplary embodiment, it is contemplated that it may be practiced as outlined above within the spirit and scope of the appended claims.

The invention claimed is:

1. A motion adaptive video signal filtering system suitable for filtering an interlaced video signal in which a frame of video information is represented by first and second interlaced fields and each of said fields includes a plurality of lines of pixel values, said system comprising:

field filtering means for processing corresponding ones of said pixel values on each of a plurality of successive lines of one of said fields to generate a field filtered video signal;

frame conversion means for combining successive pairs of said first and second interlaced fields to generate successive frames of said video signal;

frame filtering means for processing corresponding ones of said pixel values on each of a plurality of successive lines of one of the frames to generate a frame filtered video signal;

motion detection means, responsive to differences in successive ones of the frames provided by the frame conversion means, for selectively combining the field filtered video signal and the frame filtered video signal to generate an output signal.

2. A motion adaptive video signal filtering system according to claim 1, wherein the motion detection means includes:

first block conversion means for converting the pixel values in a first one of said successive frames into blocks of pixel values where each block includes N times M pixel values, representing image information conveyed by N successive pixel values in each of M successive lines, where N and M are integers;

second block conversion means for converting the pixel values in a second one of said successive frames into blocks of pixel values where each block includes N times M pixel values;

comparison means for determining respective differences in magnitude between each of the blocks provided by the first block conversion means and a respective block provided by the second block conversion means; and means, responsive to the determined difference, for providing only the frame filtered video signal when the difference is less than a first predetermined value and for providing only the field filtered video signal when the difference is greater than a second predetermined value.

3. A motion adaptive video signal filtering system according to claim 2, wherein the motion detection means further includes means, responsive to the determined difference for additively combining the field filtered video signal and the frame filtered video signal when the difference is greater than the first predetermined value and less than the second predetermined value.

4. A motion adaptive video signal filtering system according to claim 3, wherein:

the frame filtering means includes a finite impulse response (FIR) low-pass filter which attenuates vertical spatial frequency components of each frame having resolutions greater than 180 characters per picture height (CPH) relative to other vertical spatial frequency components; and the field filtering means includes an FIR low-pass filter which attenuates vertical spatial frequency components of each field having resolutions greater than 90 CPH relative to other vertical spatial frequency components.

5. A motion adaptive video signal filtering system according to claim 4, wherein the comparison means includes means for determining the average value of the squares of the differences between each pair of corresponding pixel values in the blocks provided by the respective first and second block conversion means.

6. A method of motion-adaptively filtering an interlaced video signal in which a frame of video information is represented by first and second interlaced fields and each of said fields includes a plurality of lines of pixel values, said method comprising the steps of:
   A) processing corresponding ones of said pixel values on each of a plurality of successive lines of one of said fields to generate a field filtered video signal;
   B) combining successive pairs of said first and second interlaced fields to generate successive frames of said video signal;
   C) processing corresponding ones of said pixel values on each of a plurality of successive lines of one of the frames to generate a frame filtered video signal;
   D) calculating a measure of difference in magnitude of pixel values in corresponding areas of successive ones of the frames generated at step B); and
   E) selectively combining the field filtered video signal and the frame filtered video signal, response to the measured difference in magnitude, to generate an output signal.

7. A method according to claim 6, wherein the step D) includes the steps of:
   D1) converting the pixel values in a first one of said successive frames into blocks of pixel values where each block includes N times M pixel values, representing image information conveyed by N successive pixel values in each of M successive lines, where N and M are integers;
   D2) converting the pixel values in a second one of said successive frames into blocks of pixel values where each block includes N times M pixel values;
   D3) determining respective differences in magnitude between each of the blocks provided by the first block conversion means and a respective block provided by the second block conversion means; and
   D4) providing only the frame filtered video signal when the determined difference is less than a first predetermined value, providing only the field filtered video signal when the determined difference is greater than a second predetermined value, and providing an additive combination of the frame filtered video signal and the field filtered video signal when the determined difference is greater than the first predetermined value and less than the second predetermined value.

8. A method according to claim 7, wherein the step D3) further includes the step of determining the average value of the squares of the differences between each pair of corresponding pixel values in the blocks provided by the respective first and second block conversion means.

* * * * *